US007974113B2

(12) United States Patent
Shimada et al.

(10) Patent No.: US 7,974,113 B2

(45) Date of Patent: Jul. 5, 2011

(54) ELECTRIC POWER UNIT FOR INDUCTION HEATING

(75) Inventors: Ryuichi Shimada, Tokyo (JP); Tadayuki Kitahara, Tokyo (JP); Kazuhiko Fukutani, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 210 days.

(21) Appl. No.: 12/444,159

(22) PCT Filed: Sep. 21, 2007

(86) PCT No.: PCT/JP2007/069139

§ 371 (c)(1),
(2), (4) Date: May 6, 2009

(87) PCT Pub. No.: WO2008/044512

PCT Pub. Date: Apr. 17, 2008

(65) Prior Publication Data

US 2010/0014333 A1 Jan. 21, 2010

(30) Foreign Application Priority Data

Oct. 5, 2006 (JP) ................................ 2006-273511

(51) Int. Cl.
*H02M 3/24* (2006.01)
*H05B 6/06* (2006.01)

(52) U.S. Cl. .......... 363/98; 323/239; 323/252; 219/661; 363/132

(58) Field of Classification Search .................... 363/98, 363/132; 323/225, 239, 252, 282, 284, 290; 219/660, 661

See application file for complete search history.

(56) References Cited

U.S. PATENT DOCUMENTS 4,639,849 A * 1/1987 Noworolski et al. ...... 363/56.05
6,366,474 B1 * 4/2002 Gucyski .......................... 363/20
6,700,105 B2 * 3/2004 Morrison ...................... 219/661
2003/0071034 A1 * 4/2003 Thompson et al. ........... 219/666
2006/0176034 A1 * 8/2006 Skinner ......................... 323/282
2009/0146504 A1 6/2009 Shimada et al.
2010/0090533 A1 * 4/2010 Shimada et al. ................ 307/66

FOREIGN PATENT DOCUMENTS

JP 1985-046778 A 3/1985
JP H2-276186 A 11/1990
JP 2619165 B2 6/1997

(Continued)

OTHER PUBLICATIONS

Written Opinion of the International Searching Authority of PCT/JP2007/069139 that is the basis of the present application.

(Continued)

*Primary Examiner* — Jessica Han

(74) *Attorney, Agent, or Firm* — Kenji Masaki; International Knowledge Asset Office

(57) ABSTRACT

Reverse conducting type semiconductor switches are arranged in a bride from, an energy storage capacitor is connected with its DC terminal to obtain a magnetic energy regeneration switch, and then an induction coil is connected to its AC terminal. An AC pulse current of variable frequency is obtained by applying a gate signal to the semiconductor switch to thereby turn it ON/OFF; since a voltage is generated automatically by regenerating magnetic energy, a DC power supply is connected to the opposite ends of the capacitor through a smoothing coil, thus injecting power.

3 Claims, 8 Drawing Sheets

FOREIGN PATENT DOCUMENTS

| | | | |
|---|---|---|---|
| JP | H9-294378 | A | 11/1997 |
| JP | 2000-358359 | A | 12/2000 |
| JP | 2001-15260 | A | 1/2001 |
| JP | 3264632 | B2 | 12/2001 |
| JP | 3415424 | B2 | 6/2003 |
| JP | 2004-96853 | A | 3/2004 |
| JP | 2004-260991 | A | 9/2004 |
| JP | 2005-223867 | A | 8/2005 |

OTHER PUBLICATIONS

International Preliminary Report on Patentability Chapter 1 of PCT/JP2007/069139 that is the basis of the present application.

* cited by examiner

PRIOR ART (1)

(A) PULSE RATE=2kHz (B) PULSE RATE=4kHz Both are in resonance

EXPERIMENT WAVE FORM

ELECTRIC POWER UNIT FOR INDUCTION HEATING

TECHNICAL FIELD

The present invention relates to an electric power unit for induction heating, more particularly, to an electric power unit for induction heating for supplying a high frequency alternate pulse current to an induction coil (also called a work coil) of an induction heating device.

BACKGROUND ART

Conventionally, when flowing an alternate pulse current through an inductance load such as an induction coil for an induction heating device, it is necessary to apply a high voltage from the power supply to change the current, due to the effect of magnetic (snubber) energy stored at the inductance load.

In order to flow the alternate pulse current through the induction coil by a conventional voltage-type inverter comprising semiconductor switches, the inverter must generate voltage corresponding to changes in the electric current. A difference in phase is brought about between the current and the voltage of the inverter, and the power supply becomes a so-called power supply with a low power factor.

It is possible to improve the power factor by connecting a resonance capacitor, which is often used in high frequency circuits, to the induction coil in series or in parallel, and it is, thereby, possible to reduce the inverter capacity. However, it was only possible for the inverter, for the induction heating device, using a fixed resonance capacitor to improve the power factor thereof only at a frequency specified by L and C.

By using the Magnetic Energy Recovery Switches (hereinafter, "MERSes", see Patent Literature 1), which store magnetic energy of the circuit and supply the energy to the load, and by turning ON/OFF them, the voltage necessary for changing the current drastically can be generated automatically by the current coming into a magnetic energy storage capacitor, thereby making it unnecessary for the power supply to provide the voltage.

FIG. 2 shows an alternate pulse current generating device already suggested by the inventors of the present invention. (see Patent Literatures 2 and 3.)

As shown in FIG. 2, when MERSes are inserted between AC power supply 5 and inductive load 3 and turned ON/OFF in synchronization with the AC power supply 5, magnetic energy of the inductive load 3 is stored in energy storage capacitor 2 and the energy is recovered (regenerated) again by the inductive load 3; therefore transient voltage generated by the inductance of the inductive load 3 is all generated by the MERSes.

In case that alternate pulse current is flown through an inductive load having mainly inductance component and a little resistance, it was necessary, conventionally, to apply a high voltage, from the power supply, corresponding to changes in the electric current, by the effect of magnetic energy stored at the inductive load. However in the case shown in FIG. 2, there is a merit that the necessary apply voltage is only the voltage corresponding to the resistance (a low electric voltage). In view of this merit, the patent application was filed.

[Patent Literature 1] Japanese Patent Publication No. 2000-358359

[Patent Literature 2] Japanese Patent Publication No. 2004-260991

[Patent Literature 3] Japanese Patent Publication No. 2005-223867

SUMMARY OF INVENTION

Problem to be Solved by the Invention

The alternate pulse current generating device shown in FIG. 2, however, is not very handy for an electric power unit for induction heating, because it is necessary to connect, in series, an AC power supply 5 with a large current capacity even though the voltage thereof is low.

The object of the present invention, therefore, is to provide an electric power unit for induction heating which utilizes the merits of MERS, does not need an AC power supply with a large current capacity, and yet has a simple structure comprising a small number of elements and can generate alternate pulse current.

Means for Solving the Problem

The present invention relates to an electric power unit for induction heating for providing high frequency alternate pulse current to an induction coil for induction heating of an object to be heated. The object of the present invention can be achieved by an electric power unit for induction heating comprising a DC power supply 5, a smoothing coil 4 for smoothing DC power from the DC power supply, a bridge circuit 1 having four reverse-conductive type semiconductor switches connected in a bridge structure comprising an anti-parallel circuit with a self arc-extinguishing type element and a diode, a capacitor 2 connected between the DC terminals of the bridge circuit 1, wherein magnetic energy recovered from the circuit is stored in the capacitor when the switches of the bridge circuit are turned OFF, and control unit 6 for controlling ON/OFF of the reverse-conductive semiconductor switches, wherein the control unit 6 controls, in the cycle of the alternate pulse current to be provided to the induction coil 3 so as to simultaneously turn ON/OFF a pair of the reverse-conductive type semiconductor switches located diagonally and yet to prevent the two pairs from being turned ON simultaneously, and wherein the control unit 6 controls the operation so that the frequency of the generated alternate pulse current is lower than the resonance frequency determined by the inductance of the induction coil 3 and the capacitance of the capacitor 2 to thereby maintain the resonance conditions without depending on the pulse frequency, to reuse the magnetic energy of the circuit by recovering such energy, and to continuously provide the alternate pulse current to the induction coil 3 by charging the capacitor 2 from the DC power supply 5 through the smoothing coil 4.

Moreover the object of the present invention can be achieved by an electric power unit for induction heating wherein a DC power which is acquired by rectifying an AC through a rectifying bridge diode is provided to a smoothing coil 4 from a commercial AC power supply used in place of the DC power supply 5.

BEST MODE FOR CARRYING OUT THE INVENTION

Figure 1:
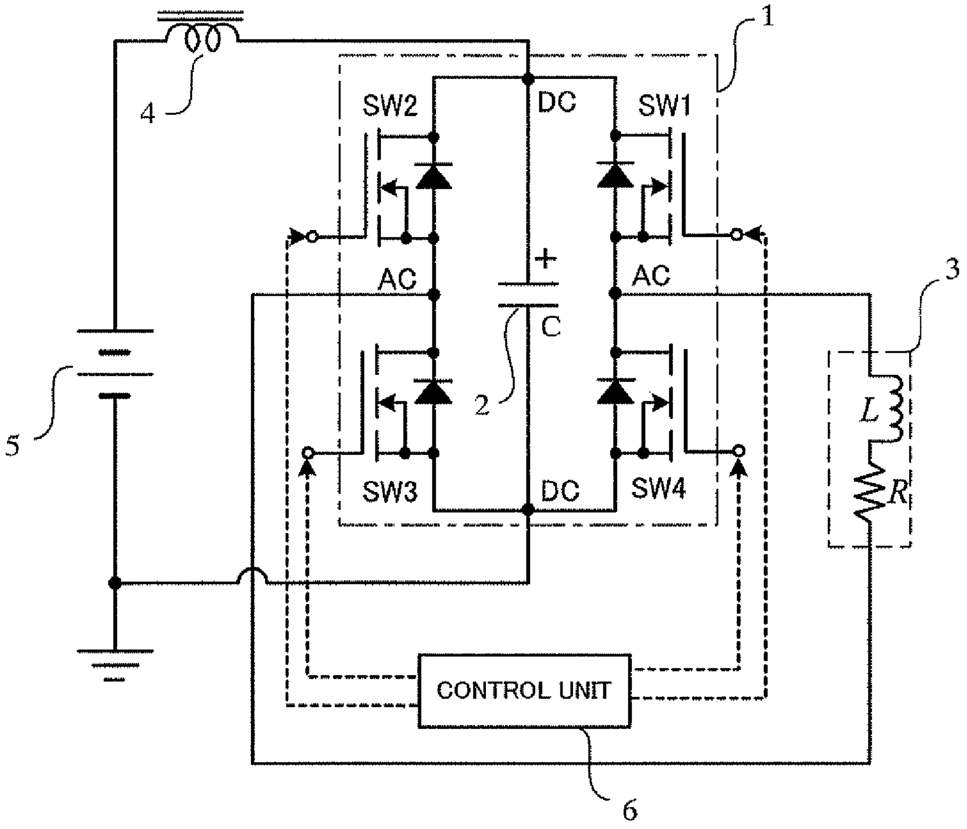
FIG. 1 is a circuit block diagram showing the structure of an electric power unit for induction heating according to the present invention.
Figure 2:
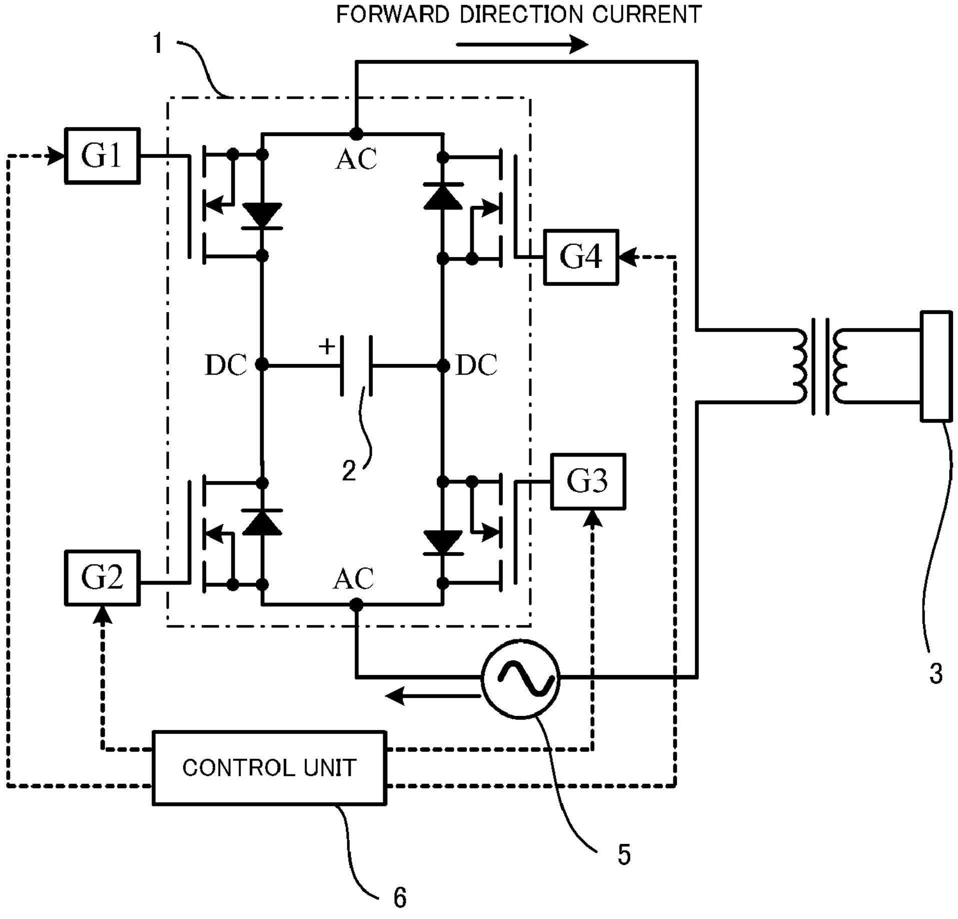
FIG. 2 is a pulse current generating device using conventional magnetic energy recovery switches.

FIG. 1 is a circuit block diagram showing the structure of an electric power unit for induction heating according to the present invention. The electric power unit for induction heating comprises a DC power supply 5, a smoothing coil 4 for smoothing the DC power from the DC power supply 5, a bridge circuit 1 comprising four reverse-conductive type semiconductor switches (SW1-SW4) connected in a bridge structure and each reverse-conductive semiconductor switch comprising an anti-parallel circuit of a self arc-extinguishing type element and a diode, a capacitor 2 connected between DC terminals of the bridge circuit 1 for storing magnetic energy recovered from the circuit when the switches of the bridge circuit 1 are turned OFF, control unit 6 to perform ON/OFF control of the reverse-conductive type semiconductor switches and an inductive load 3 including an induction coil for induction heating of an object to be heated. It is a characteristic of the electric power unit that the capacitance of the capacitor 2 can be quite small just enough for absorbing magnetic energy of the inductive load 3.

An explanation of the operation of the electric power unit for induction heating will be given using FIG. 3. The operation starts from the condition in which the capacitor 2 is charged with voltage. When gate signals are sent to the pair of the switches SW1 and SW3 of the magnetic energy recovery switches in FIG. 3(1) to turn the SW1 and SW3 ON, and electrical charge of the capacitor 2 is discharged to load 3 (the current flows in the direction shown by the arrow.) In this instance, when the pair of the switches SW2 and SW4 are turned ON, the direction of flow of the current is opposite to the direction shown by the arrow. Thus the direction of the current flow can be selected by which pair to turn ON. The current from the capacitor 2 can be stopped by turning OFF either SW1 or SW3, and coil current continues to flow through diodes. For example, if SW1 is turned OFF, the current flows through the diode of SW4.

Figure 3:
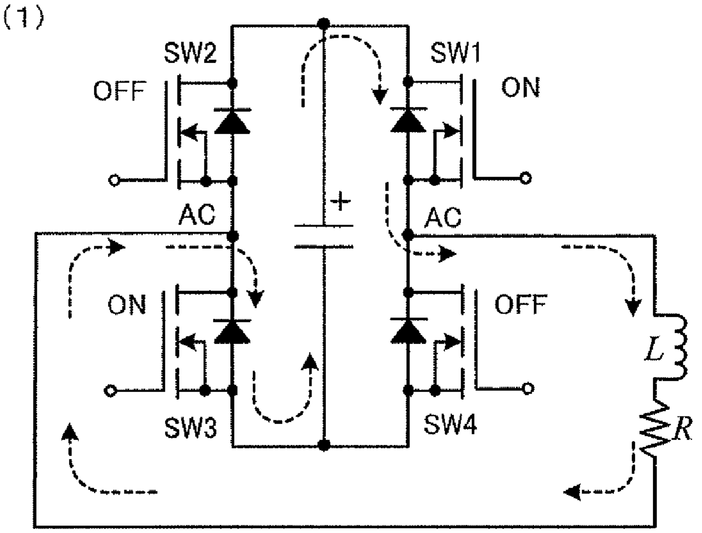
FIG. 3 is a diagram showing the operation of the generation of the pulse current of an electric power unit for induction heating according to the present invention.
Figure 3:
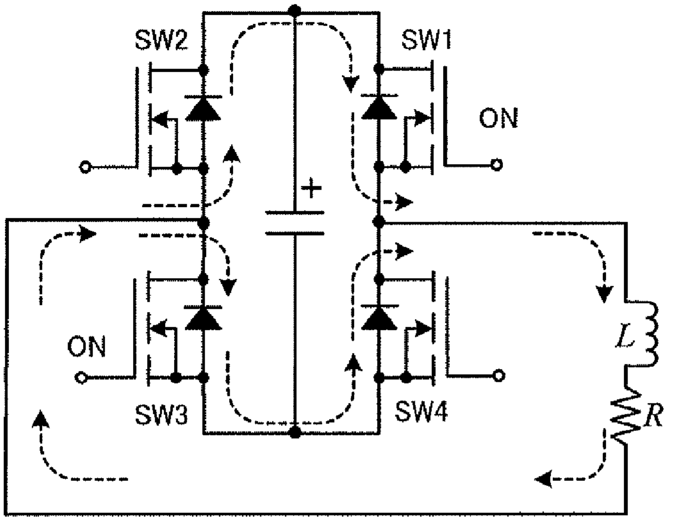
Figure 3:
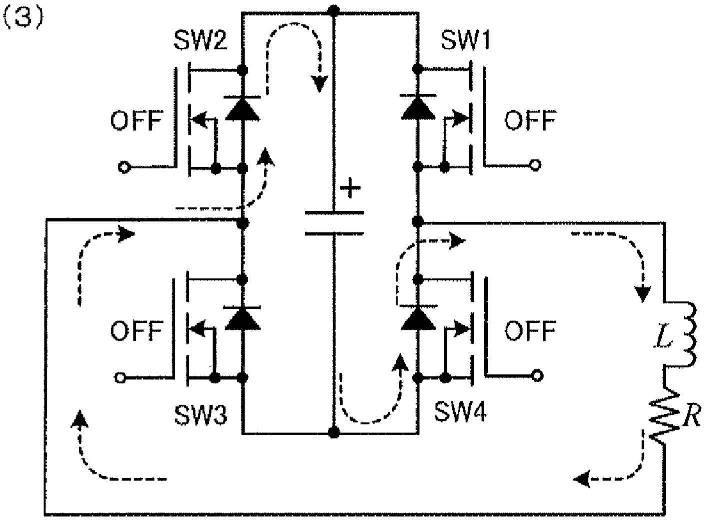

Next, FIG. 3(2) shows that when the capacitor is discharged and the voltage thereof becomes zero, the diodes of SW2 and SW4 are turned ON automatically, and the current continues to flow through all switches (a parallel-conductive condition). The current which flows to the load damps because of the resistance R of the load.

Next, as shown in FIG. 3(3), when all the switches are turned OFF, the current of the load is naturally charged in the capacitor through the diodes, and the voltage of the capacitor rises until the current stops flowing. When the current stops flowing, recovered magnetic energy will have been moved to the storage capacitor. Herein the condition of the electric power unit returns to the condition shown in FIG. 3(1). In this instance the voltage polarity of the capacitor is constant regardless of the direction of the current.

As the capacitance of the capacitor is small and the resonance frequency with the inductance L of the load is higher than the pulse frequency, semiconductor switches are in the condition of the zero voltage switching and zero current switching. That is, the electric power unit is structured in such a manner that the magnetic energy of the inductive load is recovered using the magnetic energy recovery switches and bipolar current pulse is alternately generated to the inductive load.

Figure 4:
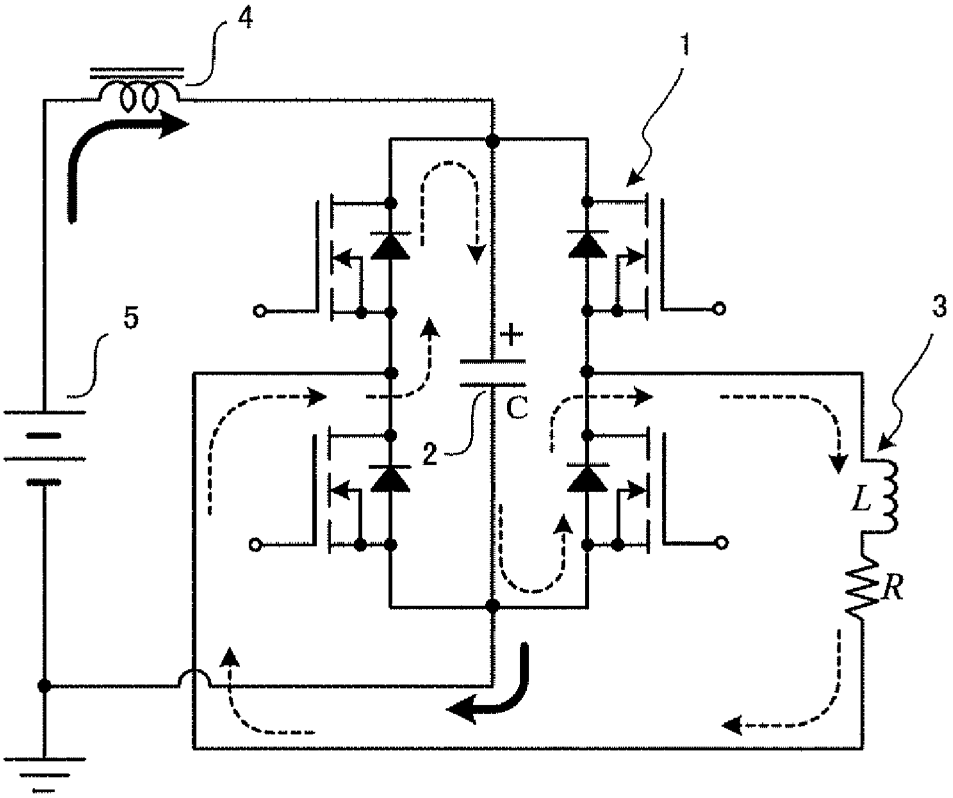
FIG. 4 is a diagram showing the power input from a DC power supply (charging of the capacitor)

The alternate pulse current damps because the energy is consumed by the resistance R included in the induction coil of the inductive load or secondary resistance magnetically induced. The energy is input from a constant-current source 5. The constant-current source 5 is connected to the storage capacitor 2, and at both ends of the capacitor 2 capacitor voltage appears during a half cycle of the resonance of L and C when the direction of the current is changed and after the gates are stopped (after all the switches are turned OFF), and there is no coil current flowing; then the electric power which is equivalent to (the electric current)×(the capacitor voltage) is input from the constant-current source 5. (FIG. 4)

A constant-current source 5 can be realized by a voltage source having a smoothing coil 4 with a large inductance. In this case the source current is made a DC with a few ripples owing to the smoothing coil 4 and becomes smaller than the oscillating pulse load current. It is a characteristic of the present invention that the constant-current source 5 may comprise a high voltage and a small current volume, and it is the merit of the present invention that the feeder from the constant-current source 5 can be thin.

Embodiment 1

Figure 5:
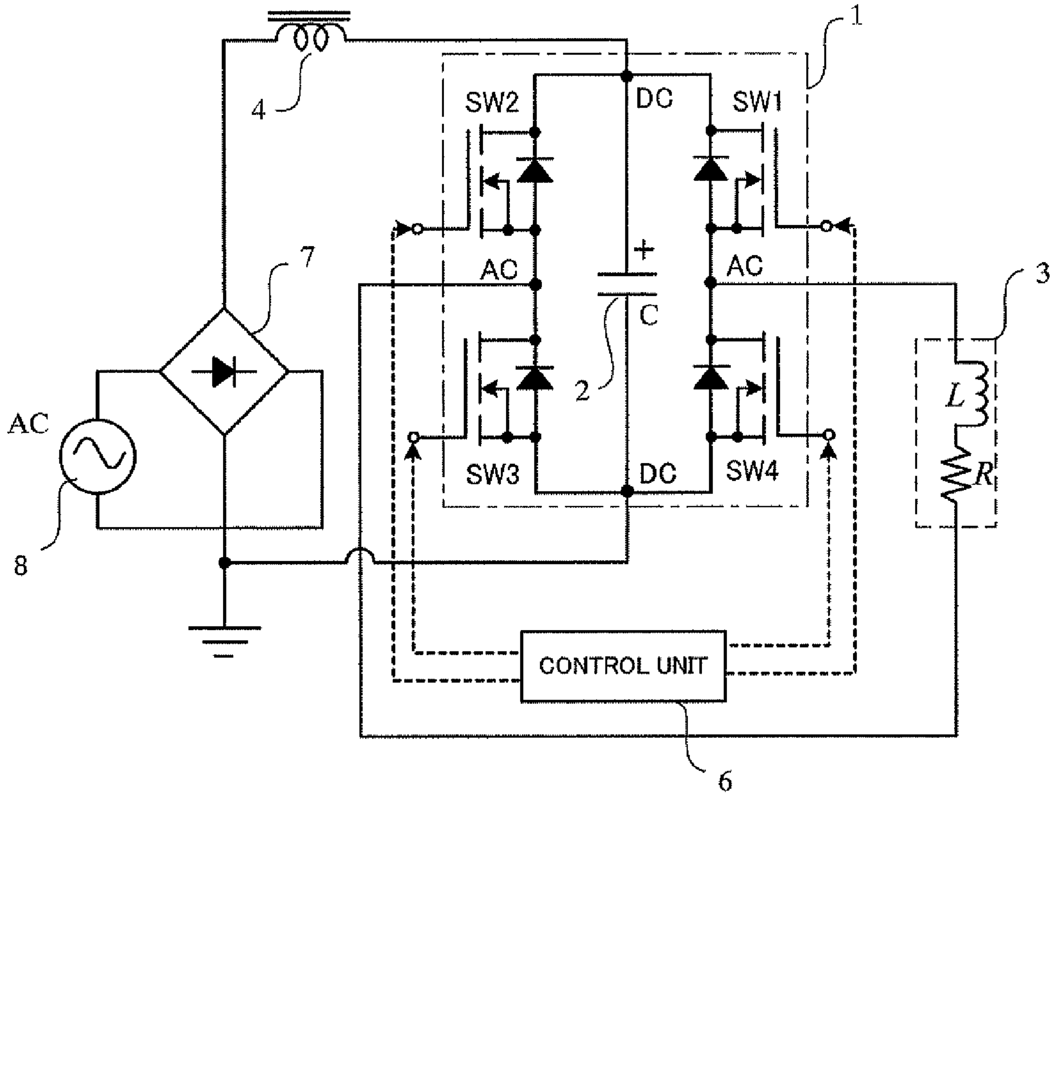
FIG. 5 is a diagram showing an embodiment in which the activation is carried out by a commercial frequency power supply.

A simulation circuit is shown in FIG. 5. The circuit constants are as follows:

energy storage capacitor 2: C=0.47 μF inductive load coil 3: L=1 mH equivalent resistance: R=5Ω current source inductance 4 (smoothing coil): L=40 mH

DC power supply: A voltage obtained by rectifying AC 100V by a bridge diode 7 The explanation of the circuit operation and rough estimates of the input power and output are as follows:

(1) As the power supply is connected through a large inductance 4, a current with a few ripples is flown.

(2) While the capacitor is charged with voltage, constant current Iin flows in and electric power is provided from the power supply. The period when the voltage is being generated in the capacitor is the period of the half cycle of the LC resonance condition between load L and energy storage capacitor C. In one cycle of the alternate pulse current there are twice of such periods and such time T is:

$$T=2\pi\sqrt{(LC)}$$

(3) The average volume of the capacitor voltage is 2/π of the peak voltage Vc; therefore, the electric power Pin during this period becomes larger as the voltage becomes larger. Also if the source voltage is constant, the current damps as the capacitor voltage becomes larger.

(4) When the load current is stopped by turning all switches OFF, the capacitor stores magnetic energy and while the capacitor keeps the voltage, electric power flows in.

(5) When short-circuited, there is no voltage. When the ratio of the time of short-circuit, the average of the capacitor voltage is defined as a wave factor D:

$$Pin=D*Vc*Iin$$

(6) In the case of this simulation, wherein D is set to 0.65, D depends on the capacitor voltage wave form.

$$Pin=0.65*Imax*Z*Iin$$

Also the ratio of equivalent resistance R and ωL of the inductive load 3 is Q of this LC resonance circuit, $$Q=\omega L/R$$

When peak voltage of the capacitor is defined as Vc, the maximum current of the induction coil Imax is as follows:

$$Imax=Vc/Z$$

when the surge impedance Z of LC circuit is set to:

$$Z=\sqrt{(L/C)}$$

The electric power consumed when the current Imax flows through the equivalent resistance R is defined as Wr. Including such a case that the current is clamped by the diode and becomes a DC, and further damps by the resistance, the value of Wr is roughly approximated to the following equation:

$$Wr=Imax*Imax*R/2$$

Until this figure balances with Pin, the voltage and the current frequencies grow.

$$Pin=0.65*Imax*Z*Iin=Imax*Imax*R/2$$

where the current ratio of Imax and Iin is derived from the above equation:

$$Imax/Iin=2*0.65*Z/R=1.3*Z/R$$

$$Imax/Iin\approx Z/R$$

This value is almost equal to Q of the circuit, and is an analogically understandable result. That is, it is considered that the electric current Q times larger than the constant-current input Iin flows through the load.

In this simulation:

$$L=1\text{ mH}$$

$$C=0.47\ \mu F$$

$$R=5\Omega$$

Figure 6:
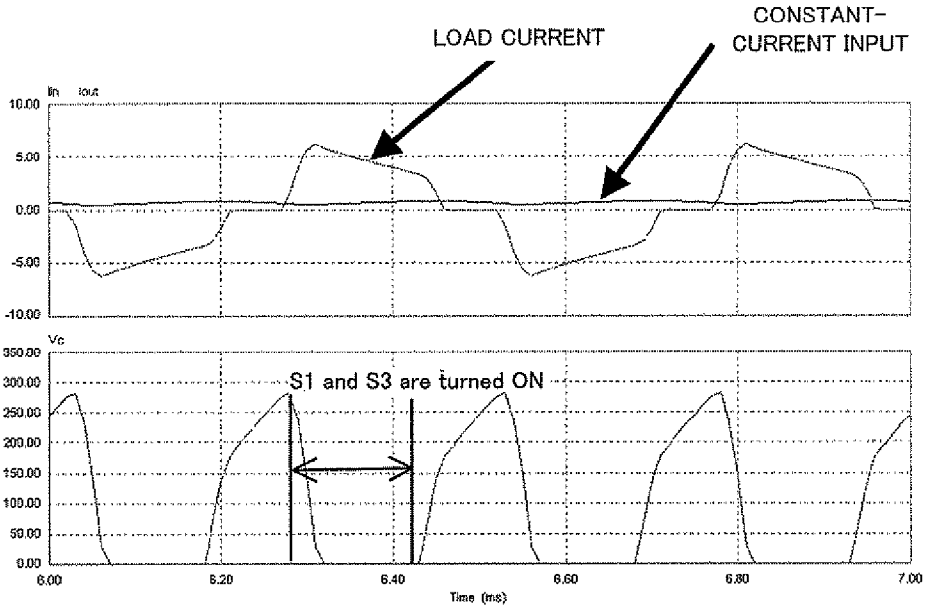
FIG. 6 shows the conditions for the simulations and results thereof in the embodiment shown in FIG. 5.
Figure 6:
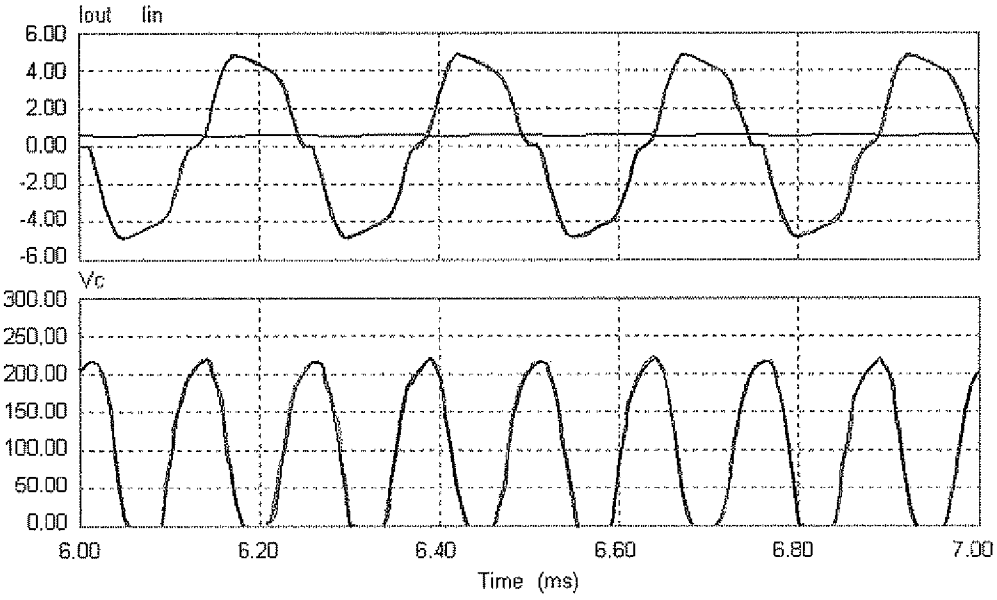

Then, $$Z=\sqrt{(L/C)}=46.12$$

and when Iin is set to:

$$Iin=0.5\text{ A}$$

$$Imax/Iin\approx Z/R=9.2$$

$$Imax=9.2*Iin=4.6\text{ A}$$

$$Vc=Imax*Z=212V$$

wherein the acquired values in the above calculations and the simulation results (FIG. 6) are roughly in accordance with each other.

What is important in the above rough estimates is that input power Pin is proportionate to R of the load and the square of the electric current, and also proportionate to the DC source voltage. That the electric current proportionate to the source voltage flows means that if the electric current having the same phase with the voltage phase such as, for example, a half wave of the AC rectified by the rectifying bridge diode and made a DC source, is flown, it will work out as the AC input with the power factor of 1.

Embodiment 2

Figure 7:
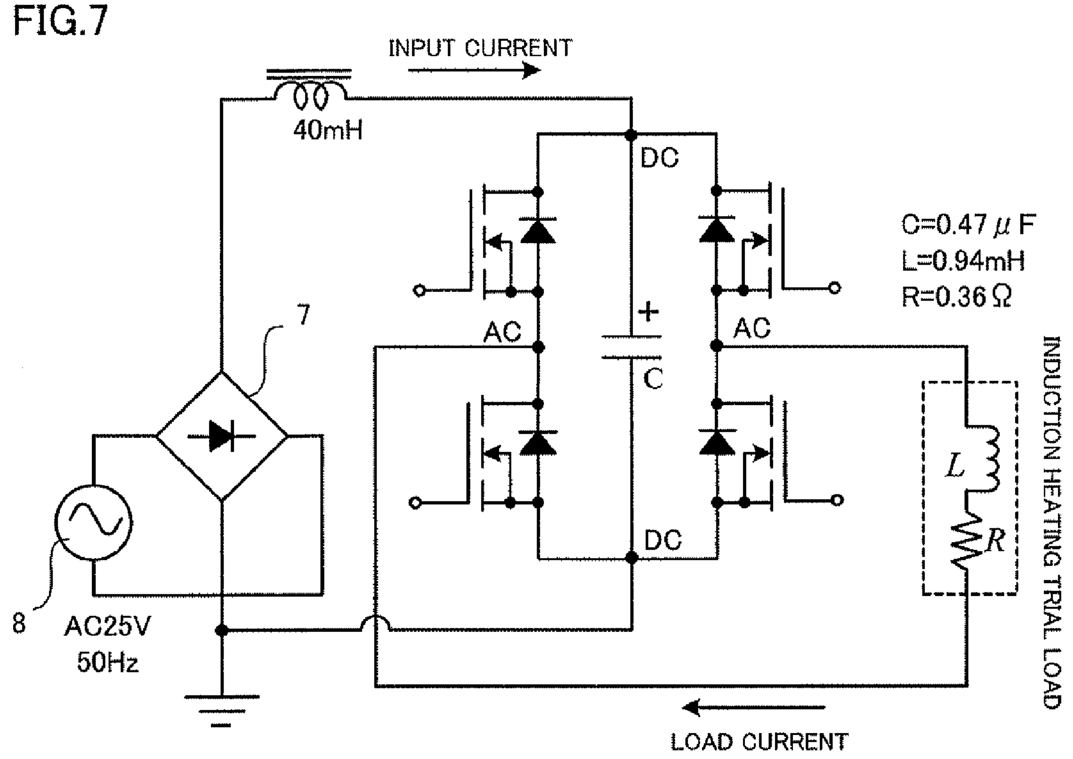
FIG. 7 shows a diagram of a circuit for a model experiment and the results thereof.
Figure 7:
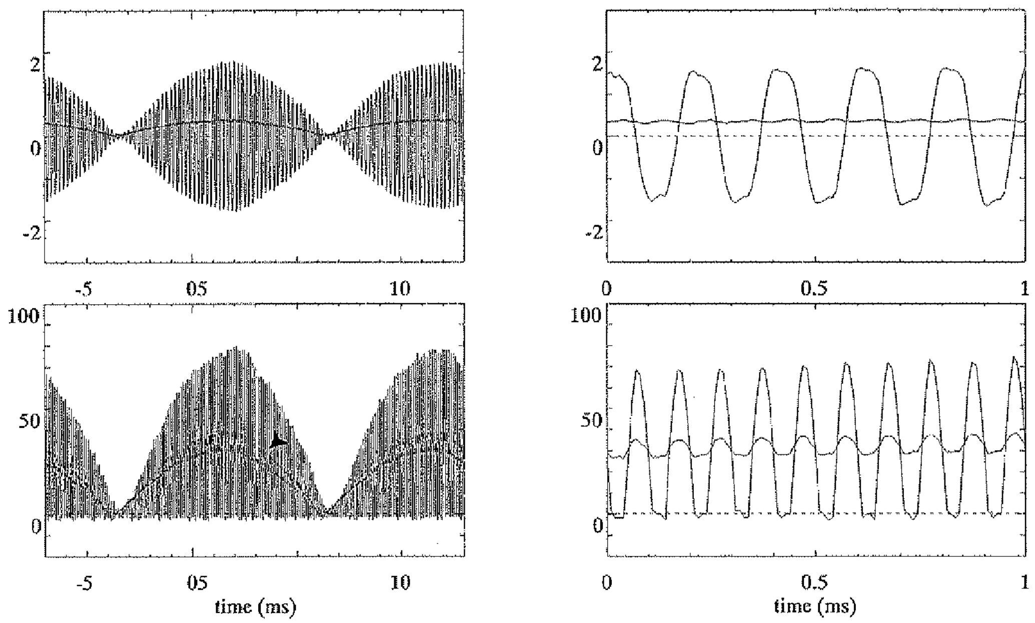

FIG. 7 shows a circuit diagram of a model experiment and the results thereof. As shown in the figure, when the current is provided from a commercial AC power supply 8 through rectifying bridge diode 7, the AC is in the same phase with the voltage and there is only a little harmonic component from the AC power supply, and yet the AC input power factor is improved.

Embodiment 3

Figure 8:
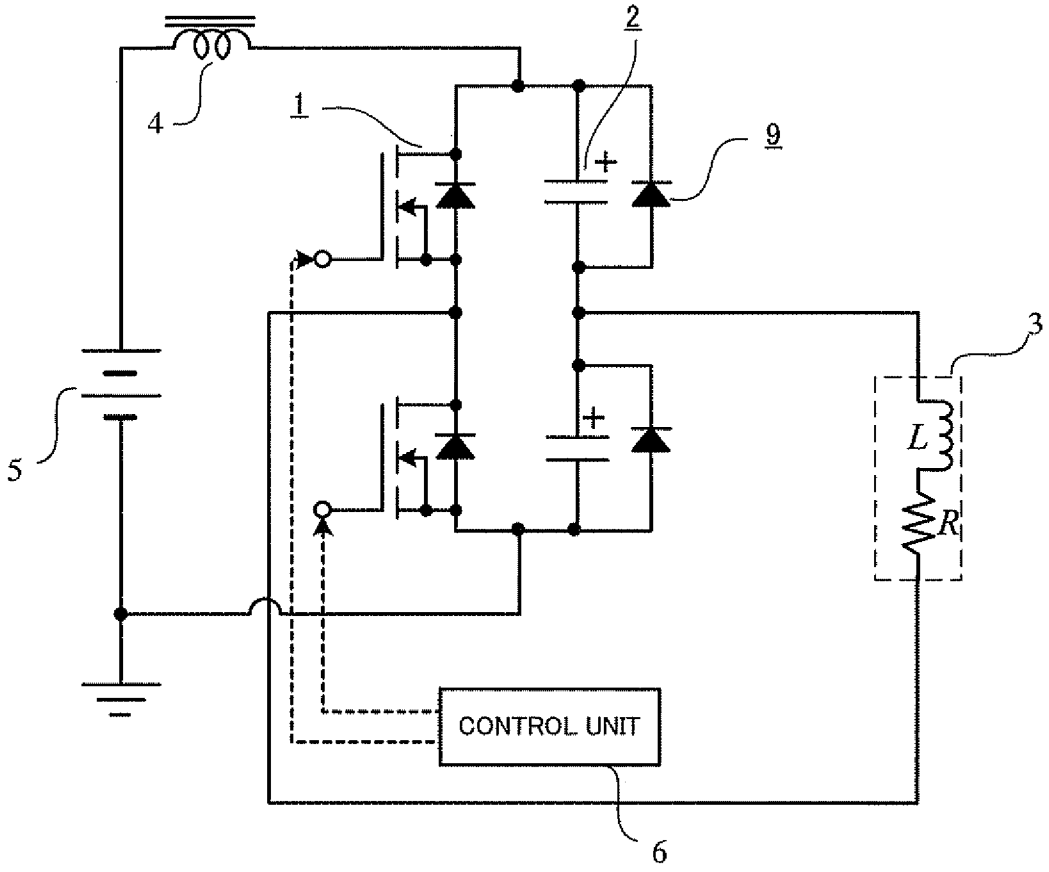
FIG. 8 is a diagram showing an embodiment of an electric power unit for induction heating utilizing magnetic energy recovery switches having a half-bridge structure.

As shown in FIG. 8, the same effect is acquired when magnetic energy recovery switches are constituted by a half bridge circuit structure. That is, the magnetic energy recovery switches comprising a bridge circuit 1 and a capacitor 2 may be replaced by magnetic energy recovery switches in a half bridge structure wherein one arm of the bridge is connected in series with two reverse-conductive type semiconductor switches and the other arm thereof is connected in series with two capacitors, and yet each capacitor is clamped by parallel diodes. While the capacitor will have the capacitance twice larger than the capacitor shown in FIG. 1, there are two switches and the electric current flows through the diodes only for a short time.

The electric power unit for induction heating according to the present invention has an excellent effect that the alternate pulse current can be generated only by magnetic energy recovery switches (MERS) and yet the frequency of the alternate pulse current can be changed by controlling the gate signals to the MERS switches.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The invention claimed is:

1. An electric power unit for induction heating for providing high frequency alternate pulse current to an induction coil (3) for induction heating of an object to be heated, the electric power unit comprising:

a DC power supply (5), a smoothing coil (4) for smoothing DC power from the DC power supply, a bridge circuit (1) having four reverse-conductive type semiconductor switches connected in a bridge structure, each reverse-conductive type semiconductor switch comprising an anti-parallel circuit with a self arc-extinguishing type element and a diode, a capacitor (2) connected between the DC terminals of the bridge circuit (1) for storing the magnetic energy recovered from the circuit when the switches of the bridge circuit (1) are turned OFF, and control unit (6) for controlling ON/OFF of the reverse-conductive type semiconductor switches, wherein the control unit (6) controls, in the cycle of the alternate pulse current to be provided to the induction coil (3) so as to simultaneously turn ON/OFF a pair of the reverse-conductive type semiconductor switches located diagonally and yet to prevent the two pairs from being turned ON simultaneously; and wherein the control unit (6) controls the operation so that the frequency of the generated alternate pulse current is lower than the resonance frequency determined by the inductance of the induction coil (3) and the capacitance of the capacitor (2) to thereby maintain the resonance conditions without depending on the pulse frequency, to reuse the magnetic energy of the circuit by recovering such energy, and to continuously provide the alternate pulse current to the induction coil (3) by charging the capacitor (2) from the DC power supply (5) through the smoothing coil (4).

2. The electric power unit for induction heating according to claim 1, wherein the DC power which is acquired by rectifying the AC through rectifying bridge diode is provided to the smoothing coil (4) from a commercial AC power supply used in place of the DC power supply (5).

3. An induction heater comprising an induction coil for induction heating of an object to be heated and an electric power unit according to claim 1, wherein a high frequency alternate pulse current is provided from the electric power unit for induction heating to the induction coil for carrying out induction heating.

* * * * *